(12) United States Patent
Maciocci et al.

(10) Patent No.: US 9,530,232 B2
(45) Date of Patent: Dec. 27, 2016

(54) AUGMENTED REALITY SURFACE SEGMENTATION

(71) Applicant: QUALCOMM Incorporated, San Diego, CA (US)

(72) Inventors: Giuliano Maciocci, Duxford (GB); James Joseph Mulholland, London (GB)

(73) Assignee: QUALCOMM INCORPORATED, San Diego, CA (US)

(*) Notice: Subject to any disclaimer, the term of this patent is extended or adjusted under 35 U.S.C. 154(b) by 148 days.

(21) Appl. No.: 13/802,194

(22) Filed: Mar. 13, 2013

(65) Prior Publication Data

US 2014/0063060 A1 Mar. 6, 2014

Related U.S. Application Data

(60) Provisional application No. 61/696,761, filed on Sep. 4, 2012.

(51) Int. Cl.
| | | |
|---|---|---|
| *G09G 5/00* | (2006.01) | |
| *G06T 11/60* | (2006.01) | |
| *G06F 3/01* | (2006.01) | |
| *G06K 9/00* | (2006.01) | |
| *G06T 19/00* | (2011.01) | |

(52) U.S. Cl.
CPC ............... *G06T 11/60* (2013.01); *G06F 3/011* (2013.01); *G06F 3/017* (2013.01); *G06K 9/00355* (2013.01); *G06K 9/00671* (2013.01); *G06T 19/006* (2013.01); *G06T 2207/20221* (2013.01); *G06T 2207/30244* (2013.01)

(58) Field of Classification Search
None
See application file for complete search history.

(56) References Cited

U.S. PATENT DOCUMENTS

| 6,771,294 B1* | 8/2004 | Pulli et al. ................... 715/863 |
|---|---|---|
| 6,891,518 B2 | 5/2005 | Sauer et al. |
| 2002/0196343 A1 | 12/2002 | Navab et al. |
| 2004/0131232 A1 | 7/2004 | Meisner et al. |

(Continued)

OTHER PUBLICATIONS

International Search Report and Written Opinion—PCT/US2013/053954—ISA/EPO—Dec. 3, 2013.

(Continued)

*Primary Examiner* — David H Chu
(74) *Attorney, Agent, or Firm* — Kilpatrick Townsend & Stockton LLP

(57) ABSTRACT

Methods, systems, computer-readable media, and apparatuses for providing intuitive, functional, and convenient ways of enabling a user of a head-mounted display unit or another augmented reality enabled device to interact with various user interfaces and other features provided by such a unit or device are presented. In some embodiments, a computing device, such as a head-mounted display unit, may receive camera input of a scene. Subsequently, the computing device may identify at least one reference object in the scene, for example, based on detecting one or more rectangles in the received camera input. The computing device then may receive input that defines a surface segment relative to the at least one reference object. Thereafter, the computing device may render the surface segment.

36 Claims, 7 Drawing Sheets

(56) References Cited

U.S. PATENT DOCUMENTS

| | | | |
|---|---|---|---|
| 2005/0289590 A1* | 12/2005 | Cheok et al. | 725/37 |
| 2006/0038833 A1* | 2/2006 | Mallinson et al. | 345/633 |
| 2008/0186255 A1* | 8/2008 | Cohen et al. | 345/8 |
| 2008/0266323 A1* | 10/2008 | Biocca et al. | 345/633 |
| 2010/0177931 A1 | 7/2010 | Whytock et al. | |
| 2010/0208033 A1* | 8/2010 | Edge et al. | 348/46 |
| 2011/0205242 A1* | 8/2011 | Friesen | 345/633 |
| 2011/0298823 A1* | 12/2011 | Kitahara | 345/632 |
| 2012/0069051 A1* | 3/2012 | Hagbi et al. | 345/633 |
| 2012/0195460 A1 | 8/2012 | Inigo | |
| 2012/0249591 A1 | 10/2012 | Maciocci et al. | |
| 2013/0222381 A1* | 8/2013 | Di Censo et al. | 345/424 |
| 2013/0278635 A1* | 10/2013 | Maggiore | 345/633 |
| 2014/0184496 A1* | 7/2014 | Gribetz et al. | 345/156 |

OTHER PUBLICATIONS

Lee, et al., "3D Natural Hand Interaction for AR Applications", Image and Vision Computing New Zealand, 2008, IVCNZ 2008, 23rd International Conference, Nov. 26, 2008, 6 pages.

Sato Y., et al., "Video-Based Tracking of User's Motion for Augmented Desk Interface", Proceedings of the Sixth IEEE International Conference on Automatic Face and Gesture Recognition (FGR'04), May 17, 2004, pp. 805-809, ISBN: 978-0-7695-2122-0.

Van Krevelen et al., "A Survey of Augmented Reality Technologies, Applications and Limitations", The International Journal of Virtual Reality 2010, 9(2), pp. 1-20.

Rautaray, S. S., et al., "Vision Based Hand Gesture Recognition for Human Computer Interaction: A Survey", Artificial Intelligence Review, Nov. 6, 2012 (Nov. 6, 2012), 54 pages.

\* cited by examiner

AUGMENTED REALITY SURFACE SEGMENTATION

CROSS-REFERENCE TO RELATED APPLICATIONS

This patent application claims priority to: U.S. Provisional Patent Application No. 61/696,761, entitled "Augmented Reality Surface Segmentation Using Rectangle Detection" filed Sep. 4, 2012; the entirety of which is hereby incorporated by reference.

BACKGROUND

Aspects of the disclosure relate to computing technologies, including computer software and computer hardware. In particular, various aspects of the disclosure relate to techniques and devices that can provide augmented reality (AR).

Increasingly, people are using various types of existing and new computing devices in a number of different ways for a number of different purposes. One type of device that has been proposed and may become increasingly popular is the head-mounted display (HMD) unit. Such a head-mounted display unit may, for example, include processing components, or communicate with another device that includes one or more processing components, to render and/or otherwise provide content to a user of the head-mounted display unit. These user interfaces may, for instance, be rendered by the head-mounted display unit on special lenses that are worn by the user over his or her eyes, such that the content appears to be wholly or partially overlaid on, and/or otherwise displayed in relation to, the user's actual physical surroundings.

Conventional and/or currently available head-mounted display units are typically limited by the processing power and other resources that are required to provide these functionalities. Further, the content provided by these head-mounted display units may be rudimentary and/or inconvenient.

BRIEF SUMMARY

Certain embodiments are described that provide more intuitive, functional, and convenient ways of enabling a user of a head-mounted display unit to interact with various user interfaces and other features provided by the head-mounted display unit.

In some embodiments, and as discussed in greater detail below, a real-world surface may be segmented in real time, using a combination of rectangle tracking techniques and finger tracking techniques that utilize input received via a head-mounted camera. In at least one arrangement, an everyday object, such as a smartphone, may be used as a reference object, which also may be referred to as a "reference object," for tracking various objects and determining surface plane alignment. Such object tracking and surface plane alignment determinations may, for example, be subsequently used in rendering, via the head-mounted display unit, a user interface or other virtual object that is correctly aligned to the physical surface upon which it is anchored.

Some examples of the user interfaces and other virtual objects that can, in accordance with various aspects of the disclosure, be rendered on a surface segment via a head-mounted display unit include: web pages, shared and/or collaborative workspaces, navigable applications, games, virtual keyboards and/or other virtual peripherals and input devices, video and/or media playback applications, statistical visualizations and/or other data representations, and various three-dimensional objects. While these types of user interfaces and virtual objects are listed here as examples of what can be rendered using a head-mounted display unit, any other type of user interface or virtual object likewise may be rendered and/or otherwise provided instead of and/or in addition to those listed above.

In some embodiments a computing device, such as a head-mounted display unit, may receive camera input of a scene. Subsequently, the computing device may identify at least one reference object in the scene, for example, based on detecting one or more rectangles in the received camera input. The computing device then may receive input that defines a surface segment relative to the at least one reference object. Thereafter, the computing device may render the surface segment.

In some embodiments a system for augmented reality surface segmentation may comprise a means for optical sensing an image of a scene; a means for identifying at least one reference object in the scene, wherein the reference object is a physical object; a means for receiving input defining a surface segment relative to the at least one reference object; and a means for causing the surface segment to be rendered.

In some embodiments of the system, the means for identifying at least one reference object in the scene includes means for detecting one or more feature points in the received camera input.

In some embodiments of the system, the means for identifying at least one reference object in the scene includes means for receiving a wireless communication from the at least one reference object.

In some embodiments of the system, the means for identifying at least one reference object in the scene includes means for detecting one or more rectangles in the received camera input.

In some embodiments the system for augmented reality surface segmentation may further comprise: a means for determining, based on the one or more detected rectangles, a current perspective of the scene, wherein the surface segment is rendered relative to the current perspective of the scene.

In some embodiments the system for augmented reality surface segmentation may further comprise: a means for dynamically updating the rendered surface segment based on determining that the current perspective of the scene has changed.

In some embodiments of the system, the input defining the surface segment is a finger movement defining a shape of the surface segment, wherein the finger movement is performed by a user of a device causing the surface segment to be rendered.

In some embodiments of the system, the means for causing the surface segment to be rendered comprises: means for rendering, in a virtual workspace, the surface segment at a first angle; and means for rendering, in the virtual workspace, a second surface segment defined by the user at a second angle different from the first angle.

In some embodiments the system for augmented reality surface segmentation may further comprise: a means for closing the virtual workspace based on determining that the at least one reference object has been removed from the scene.

In some embodiments the system for augmented reality surface segmentation may further comprise: a means for opening the virtual workspace based on determining that the at least one reference object has been reintroduced into the scene or another scene.

In some embodiments the system for augmented reality surface segmentation may further comprise: a means for opening a second virtual workspace different from the virtual workspace based on detecting a second reference object different from the at least one reference object.

In some embodiments of the system, detecting the second reference object comprises identifying the second reference object based on a code displayed by the second reference object.

In some embodiments the system for augmented reality surface segmentation may further comprise: a means for transmitting a data signal comprising a virtual workspace that includes the surface segment to at least one other device.

In some embodiments of the system, the virtual workspace is defined by a first user that provided the input defining the surface segment, and the at least one other device is associated with a second user different from the first user.

In some embodiments of the system, the means for causing the surface segment to be rendered comprises: means for rendering the virtual workspace for the first user; and means for dynamically updating, based on the second user's interaction with one or more virtual objects included in the virtual workspace, the rendering of the virtual workspace for the first user.

In some embodiments the system for augmented reality surface segmentation may further comprise a means for determining a pose of the at least one reference object based at least in part on the camera input, and a means for determining a virtual surface separate from the at least one reference object based at least in part on the determined pose, wherein the surface segment is rendered on the virtual surface.

In some embodiments a system for augmented reality surface segmentation may comprise a non-transient computer readable medium comprising program code, which when executed by a processor is configured to cause the processor to: receive a camera input of a scene; identify at least one reference object in the scene, wherein the reference object is a physical object; receive input defining a surface segment relative to the at least one reference object; and render the surface segment.

In some embodiments identifying at least one reference object in the scene includes detecting one or more feature points in the received camera input.

In some embodiments identifying at least one reference object in the scene includes receiving a wireless communication from the at least one reference object.

In some embodiments identifying at least one reference object in the scene includes detecting one or more rectangles in the received camera input.

In some embodiments a system for augmented reality surface segmentation may further comprise program code, which when executed by a processor is configured to cause the processor to: determine, based on the one or more detected rectangles, a current perspective of the scene, wherein the surface segment is rendered relative to the current perspective of the scene.

In some embodiments a system for augmented reality surface segmentation may further comprise program code, which when executed by a processor is configured to cause the processor to: dynamically update the rendered surface segment based on determining that the current perspective of the scene has changed.

In some embodiments the input defining the surface segment is a finger movement defining a shape of the surface segment wherein the finger movement is performed by a user of a device causing the surface segment to be rendered.

In some embodiments rendering the surface segment comprises: rendering, in a virtual workspace, the surface segment at a first angle; and rendering, in the virtual workspace, a second surface segment at a second angle different from the first angle.

In some embodiments a system for augmented reality surface segmentation may further comprise program code which when executed by a processor is configured to cause the processor to: determine that the at least one reference object has been removed from the scene, and close the virtual workspace based on determining that the at least one reference object has been removed from the scene.

In some embodiments a system for augmented reality surface segmentation may further comprise program code which when executed by a processor is configured to cause the processor to: determine that the at least one reference object has been reintroduced into the scene or another scene, and opening the virtual workspace based on determining that the at least one reference object has been reintroduced into the scene or another scene.

In some embodiments a system for augmented reality surface segmentation may further comprise program code which when executed by a processor is configured to cause the processor to: detect a second reference object different from the at least one reference object, and open a second virtual workspace different from the virtual workspace based on detecting a second reference object different from the at least one reference object.

In some embodiments detecting the second reference object includes identifying the second reference object based on a code displayed by the second reference object.

In some embodiments a system for augmented reality surface segmentation may further comprise program code which when executed by a processor is configured to cause the processor to: transmit a data signal comprising a virtual workspace that includes the surface segment to at least one other device.

In some embodiments the virtual workspace is defined by a first user that provided the input defining the surface segment, and the at least one other device is associated with a second user different from the first user.

In some embodiments rendering the surface segment comprises: rendering the virtual workspace for the first user; and determining the user's interaction with one or more virtual objects included in the virtual workspace, and dynamically updating the rendering of the virtual workspace for the first user based on the second user's interaction with one or more virtual objects included in the virtual workspace.

In some embodiments a system for augmented reality surface segmentation may further comprise program code which when executed by a processor is configured to cause the processor to determine a pose of the at least one reference object based at least in part on the camera input, and determine a virtual surface separate from the at least one reference object based at least in part on the determined pose, wherein the surface segment is rendered on the virtual surface.

In some embodiments a method for use with an augmented reality enabled device may comprise detecting motion of a user; and defining a virtual workspace based on the detected motion.

In some embodiments detecting the motion comprises tracking an eye gaze of the user.

In some embodiments detecting the motion comprises tracking at least one finger of the user.

In some embodiments detecting the motion comprises using at least one inertial sensor to determine motion of the device.

In some embodiments the virtual workspace is defined with respect to a virtual object.

In some embodiments the virtual workspace comprises one or more windows for display on the augmented reality enabled device, the windows being displayed with respect to one or more surfaces in a scene visible to a user of the augmented reality enabled device.

In some embodiments a method for use with an augmented reality enabled device may further comprise saving a representation of the virtual workspace for transmission or future access.

In some embodiments a method for use with an augmented reality enabled device may comprise obtaining information descriptive of a user-defined virtual workspace; identifying at least one anchor object; identifying a surface based at least in part on the identified anchor object; and rendering at least a portion of the virtual workspace with respect to the surface.

In some embodiments the obtaining comprises accepting user input from a camera.

In some embodiments the obtaining comprises receiving the information from the anchor object.

In some embodiments the obtaining comprises downloading the information from a server.

In some embodiments a method for use with an augmented reality enabled device may comprise receiving information describing a virtual workspace for display to a first user on a first augmented reality enabled device, the virtual workspace having been defined relative to a remote object by a remote user of a second augmented reality enabled device; identifying a reference object; and causing at least a portion of the virtual workspace to be displayed to the first user on the first augment reality enable device, the virtual workspace being displayed relative to the reference object.

In some embodiments the virtual workspace is displayed to the first user such that it appears upright to the first user.

In some embodiments an upright appearance is defined by how the remote user is viewing the virtual workspace on the first augmented reality enable device.

In some embodiments the identified reference object comprises the remote object.

In some embodiments the absolute position of elements of the virtual workspace are maintained with respect to the remote object regardless of a position of the first user or the remote user.

In some embodiments the identified reference object comprises the remote object.

In some embodiment elements of the virtual workspace are displayed in positions or orientations relative to the remote object which are different than positions or orientations of the elements as displayed relative to the remote object to the remote user.

In some embodiments the remote object and the identified reference object are different objects.

In some embodiments a method for use with an augmented reality enabled device may further comprise determining whether the first user has permission to adjust the virtual workspace, and if the first user has permission to adjust the virtual workspace, determining whether to adjust the virtual workspace locally or whether to adjust the virtual workspace remotely.

In some embodiments remote adjustment of the virtual workspace adjusts how the virtual workspace is being displayed to the remote user on the second augmented reality enabled device.

BRIEF DESCRIPTION OF THE DRAWINGS

Aspects of the disclosure are illustrated by way of example. In the accompanying figures, like reference numbers indicate similar elements, and.

DETAILED DESCRIPTION

Figure 1:
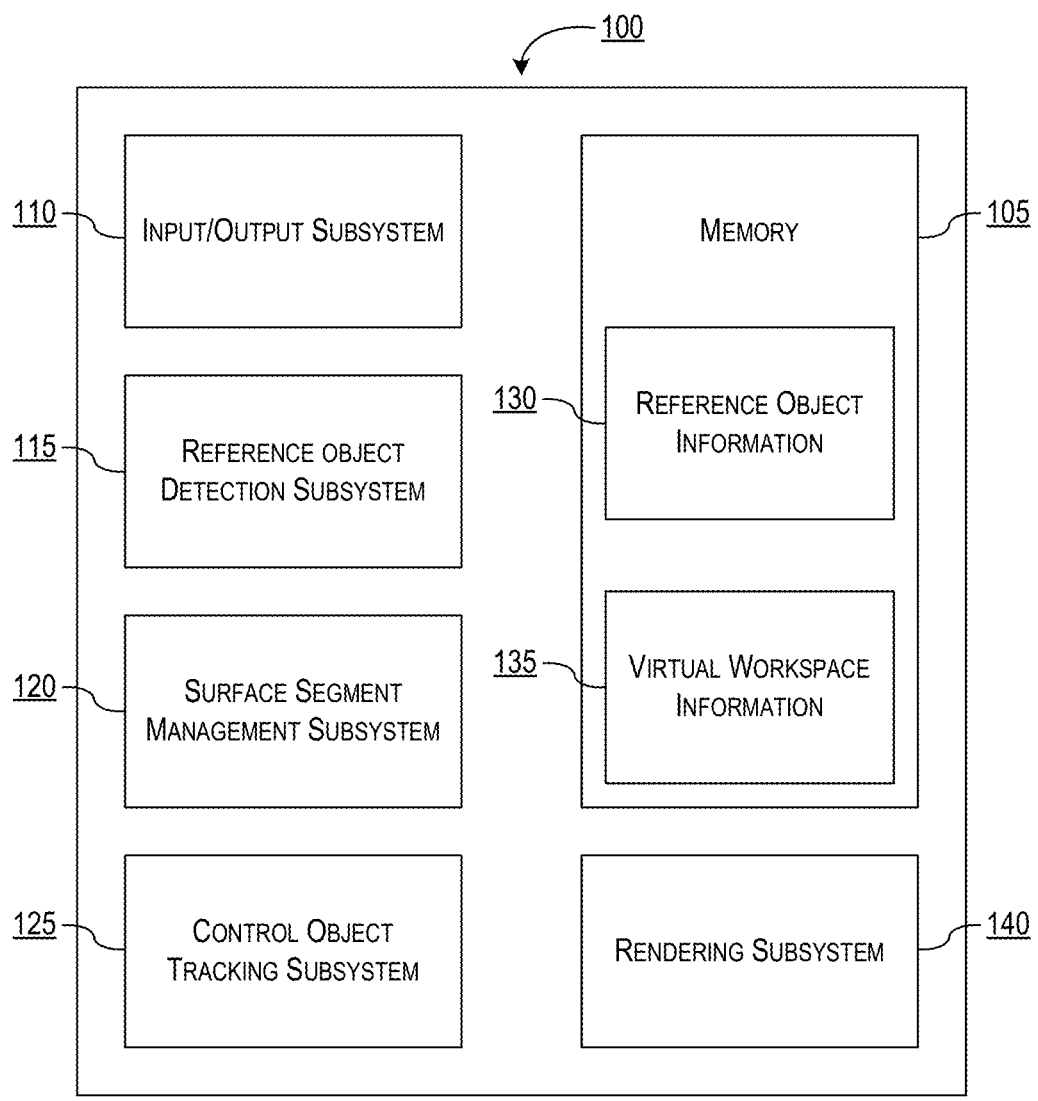
FIG. 1 illustrates a simplified diagram of a system that may incorporate one or more embodiments.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

As noted above, various aspects of the disclosure relate to new ways of interacting with head-mounted display units, particularly head-mounted display units that are capable of detecting hand movements, such as hand movements and/or finger movements which can be interpreted as interactions with virtual content that is displayed through the head-mounted display unit. Using the technologies described herein, a virtual desktop can be provided in which a user may "lay" out different pieces of data, and have representations of such data rendered through their head-mounted display unit, in close proximity to and/or otherwise in relation to a physical surface that exists in the user's physical environment.

In one or more arrangements, a head-mounted display unit may render such a virtual desktop, as well as one or more surface segments which may form the virtual desktop, in relation to a physical surface on which a reference object is placed. The reference object may, for instance, be a smart phone or other physical object (e.g., a pad of paper, a stack of sticky notes, etc.) that can be detected by the head-mounted display unit, and can further be used in determining the current perspective at which the user of the head-mounted display unit is viewing the physical surface on which the reference object is placed and, correspondingly, the perspective at which the user is viewing the virtual workspace being rendered by the head-mounted display unit. In particular, the head-mounted display unit, and/or a processing device connected to the head-mounted display unit, may use one or more reference object detection algorithms to determine the current perspective at which the user of the head-mounted display unit is viewing both the physical surface(s) and the virtual surface(s). These reference object detection algorithms may, for instance, be able to determine such a perspective, which may also be referred to as the "camera pose," by identifying one or more rectangles that are visible in a scene captured by a head-mounted camera, and by subsequently determining a current viewing angle of the identified rectangle(s) based on the fact that, when viewed straight on, such rectangle(s) would each have perpendicular corners and parallel sides.

As a result of these and other features, various aspects of the disclosure provide a number of advantages over existing and conventional computing devices. For example, some embodiments may allow a user to place, position, and/or otherwise lay out digital content and/or other virtual items in a virtual workspace that is larger in size than what might typically be capable of being displayed on a conventional computer display screen. In addition, the variable perspective and variable object alignment, as may be provided via a head-mounted display unit, may allow for better customization of a user experience.

Furthermore, a real world object may be used as a reference point not only for positioning an interface that may be displayed via a head-mounted display unit, but also as a reference identifier for accessing one or more particular virtual workspaces across the durations of one or more sessions provided via the head-mounted display unit. This functionality in turn may, for example, allow a user to pack up their digital data very quickly, without having to worry about needing to recreate their virtual workspace, or other particular layout of digital data, in the future.

For example, in accordance with some embodiments, when a user of a head-mounted display unit picks up an object that is being used as a reference object, such as their smartphone, all of the windows and/or other virtual objects included in a virtual workspace displayed by the head-mounted display unit may automatically disappear from the rendered display. Subsequently, when the user places the reference object back down and/or otherwise in view of the head-mounted display unit, the head-mounted display unit may render the virtual workspace as it was when the reference object was removed, thereby allowing the user to resume their session at the point at which the user left it. The head-mounted display unit may, for instance, detect such introduction and/or removal of a particular reference object using a camera included in and/or otherwise communicatively coupled to the head-mounted display unit. Not only may the relative positions of different surface segments be maintained between when the reference object is removed and reintroduced, but the current state of programs or functionality associated with one or more of the surface segments may be maintained. For example, a movie playing in one of the segments may be paused and automatically resumed, or a document in one of the segments may saved and redisplayed in its previous state.

Various embodiments will now be discussed in greater detail with reference to the accompanying figures, beginning with FIG. 1.

FIG. 1 illustrates a simplified diagram of a system 100 that may incorporate one or more embodiments. As seen in FIG. 1, system 100 may include a memory 105, as well as multiple subsystems, including an input/output subsystem 110, a reference object detection subsystem 115, a surface segment management subsystem 120, a control object tracking subsystem 125, and a rendering subsystem 140. One or more communication paths may be provided that enable the one or more subsystems to communicate with and exchange data with each other. In addition, the various subsystems illustrated in FIG. 1 may be implemented in software, hardware, or combinations thereof. In some embodiments, system 100 may be incorporated in a computing device, such as a computing device that is communicatively coupled to a head-mounted display (HMD) unit. In some other embodiments, system 100 may be incorporated directly into an HMD unit itself or another type of heads-up display. In some embodiments, the elements of system 100 may be incorporated into a type of augmented reality-enabled device—for example, a mobile phone, a tablet computer, and/or a television configured to implement augmented reality—other than an HMD. In some embodiments, all of the components shown in FIG. 1 may be incorporated into a HMD. In other embodiments, some of the components shown in FIG. 1 may be incorporated into a HMD, while the remainder of the components may be incorporated into another device that is communicatively connected to the HMD. For example, some components shown in FIG. 1 may be incorporated into an HMD, and the remainder of the components shown in FIG. 1 may be incorporated into mobile device, such as a smartphone, that is communicatively connected to the HMD.

In various embodiments, system 100 may include other subsystems than those shown in FIG. 1. Additionally, the embodiment shown in FIG. 1 is only one example of a system that may incorporate some embodiments, and in other embodiments, system 100 may have more or fewer subsystems than those illustrated in FIG. 1, may combine two or more subsystems, or may have a different configuration or arrangement of subsystems.

In some embodiments, input/output subsystem 110 may provide one or more interfaces that enable input to be received from, and/or output to be provided to, a user of system 100. For example, input/output subsystem 110 may include one or more input devices, such as one or more buttons or keys, one or more ports (e.g., a serial port), and/or other input devices. In at least one arrangement, input/output subsystem 110 further may include one or more cameras. In some instances, at least one of the cameras included in input/output subsystem 110 may, for example, be worn by a user in such a way as to operate as a head-mounted camera, and may further be configured to capture an image of a scene viewed by the user. In other arrangements, input/output subsystem 110 may additionally or alternatively include one or more other input systems and/or sensors that may be configured to capture input from a user of system 100, such as one or more inertial sensors, one or more microphones, one or more gaze tracking sensors, one or more grip sensors, and/or the like. In other embodiments, one or more of ultrasound or other audio, infrared, Ultra Violet, Electro-Magnetic radiation, Microelectromechanical Systems (MEMS) devices, etc. may form a component of input/output subsystem 110. In addition, input/output subsystem 110 may include one or more output devices, such as one or more display screens, one or more audio speakers, and/or other output devices. In some instances, at least one of the display screens included in input/output subsystem 110 may be worn by a user in a way that wholly or partially encompasses the user's field of view, which may thereby enable system 100 to operate as a head-mounted display unit.

In some embodiments, reference object detection subsystem 115 may enable system 100 to identify and/or otherwise detect one or more reference objects in an image of a scene captured by system 100. In addition, reference object detection subsystem 115 may enable system 100 to determine, based on the one or more identified reference objects, a camera pose for system 100, or some other description of the user's perspective of the scene that is currently being viewed. As noted above, the camera pose may define the perspective at which a user of system 100 is viewing the scene that includes the one or more identified and/or otherwise detected reference objects. Additionally, detecting and/or using one or more reference objects in this way may provide better power efficiency and/or pose detection functionalities than some other techniques. In some arrangements, reference object detection subsystem 115 may additionally or alternatively be configured to detect other objects that are not rectangular in shape (e.g., by detecting other shapes in an image of a scene captured by system 100). Additionally, in some instances, multiple objects may be detected and/or used in determining a camera pose, and reference object detection subsystem 115 may be user-configurable, in that a user may be able to set or select which objects and/or shapes are detected (e.g., based on feature points associated with such objects and/or shapes). For example, reference object detection subsystem 115 may be configured to detect one or more of a plurality of shapes. Further, reference object detection subsystem 115 may be configured to detect shapes such as rectangles, squares, circles, or triangles. In other embodiments, reference object detection subsystem 115 may be configured to detect specific objects, e.g. devices, artwork, writing utensils, hand drawings, or images displayed on one or more devices. In some embodiments, reference object detection subsystem 115 may be configured to detect a mobile phone and/or a rectangle, for example when the reference object is a mobile phone of the user. Such embodiments may be beneficial because the user may be likely to have their phone with them and thus may be able to conveniently utilize one or more of the embodiments described here. Further, rectangle detection may be efficiently implemented in some embodiments, as described in greater detail below.

In some embodiments, surface segment management subsystem 120 may enable system 100 to render a virtual workspace and/or one or more surface segments included in such a virtual workspace. For example, in one embodiment, a virtual workspace may comprise one or more virtual objects associated with user applications. In other embodiments, a virtual workspace may comprise virtual objects associated with a user's virtual desktop. These virtual objects may comprise tools the user uses to complete various tasks, e.g. graphical software, text software, presentation software, or other type of software commonly associated with a workplace. In some embodiments, the virtual workspace comprises one or more segments or regions which a user has defined and/or associated with a particular application or function. For example, one segment may have been designated by the user as including a media player, while another segment may have been designated by the user for use with a messaging application such as an SMS application or an email program. In some embodiments, one or more segments may be associated with two dimensional content such that the segment appears to be flush against a surface, while one or more other segments may be associated with three dimensional content, for example such that the content may appear to the user as if it is a hologram. Any number of other segments or configurations may be implemented. In some embodiments, surface segment management subsystem 120 may be configured to generate one or more user interfaces and/or other virtual objects to be rendered by system 100, determine the perspective at which such user interfaces and/or virtual objects should be rendered at any particular moment (e.g., based on the current perspective determined by reference object detection subsystem 115), and/or provide the generated user interfaces and/or virtual objects, along with any relevant perspective information, to rendering subsystem 140.

In some embodiments, control object tracking subsystem 125 may enable system 100 to identify and/or otherwise detect one or more reference objects, such as one or more reference objects with respect to which one or more surface segments and/or one or more virtual workspaces can be provided. For example, control object tracking subsystem 125 may enable system 100 to identify a particular reference object based on the unique features of the reference object that may be detected in an image of a physical scene which includes the reference object. In addition, control object tracking subsystem 125 may enable system 100 to identify a particular reference object that is in the vicinity of system 100 based on one or more electronic signals transmitted to and/or received from the reference object. Further still, control object tracking subsystem 125 may enable system 100 to identify and/or load one or more particular virtual workspaces and/or surface segments based on the identity of the reference object and/or a code displayed by the reference object or other captured information associated with the reference object that uniquely identifies one or more particular virtual workspaces and/or surface segments to be displayed (e.g., when the reference object is in view of a user of system 100). For example, a visual indicator, such as a Quick Response (QR) code, may be displayed on and/or by a reference object, and control object tracking subsystem 125 of system 100 may be configured to identify the reference object based on the visual indicator. In some embodiments this visual indicator may comprise another indicator, for example, a known pattern such as a bar code, a multidimensional bar code, or a known image. In other instances, control object tracking subsystem 125 may be configured to identify a reference object based on a wireless signal transmitted by the reference object (e.g., a Bluetooth signal, a Near Field Communications (NFC) signal, etc.).

In some embodiments, memory 105 may be configured to store and/or retrieve various types of information that may be used by system 100 and/or the various subsystems included in system 100. For example, memory 105 may store reference object information 130 and virtual workspace information 135. Reference object information 130 may, for instance, include information describing and/or defining various properties of one or more reference objects, such as properties that uniquely identify particular reference objects. For example, in one embodiment, a mobile device may be in communication with a HMD or other Augmented Reality enabled device, and the smartphone may be the reference object. In such an embodiment, the mobile device may be configured to recognize itself as the reference object. In another embodiment, the mobile device may display an image, such as a graphic or bar code associated with the reference object. In such an embodiment, this may enable the HMD or other Augmented Reality enabled device to detect the mobile device as the reference object. In addition, virtual workspace information 135 may include information describing and/or defining various properties of one or more virtual workspaces that can be provided via system 100, including various properties of one or more surface segments, one or more user interfaces, and/or one or more other virtual objects that may be included in such virtual workspaces. While these types of information are listed here as examples of the types of information that may be stored by memory 105 in some embodiments, memory 105 may store one or more other types of information instead of and/or in addition to the types of information discussed here.

In some embodiments, rendering subsystem 140 may enable system 100 to draw, render, and/or otherwise display one or more virtual workspaces, one or more surface segments, and/or one or more other virtual objects. For example, one or more other subsystems of system 100 may provide rendering subsystem 140 with information about one or more virtual workspaces, one or more surface segments, and/or one or more other virtual objects to be rendered, and rendering subsystem 140 may accordingly cause the one or more virtual workspaces, one or more surface segments, and/or one or more other virtual objects to be displayed by system 100. In some instances, the information provided to and/or otherwise used by rendering subsystem 140 may include camera pose information and/or other perspective information, as this may enable rendering subsystem 140 to draw, render, and/or otherwise display various virtual objects at particular orientations and/or angles relative to the physical surroundings of system 100.

An example of the ways in which a device such as system 100 can be used will now be discussed in greater detail with respect to FIGS. 2-7. In particular, FIGS. 2-7 illustrate a sequence of diagrams that depict an example of providing augmented reality surface segmentation using reference object detection according to some embodiments.

Figure 2:
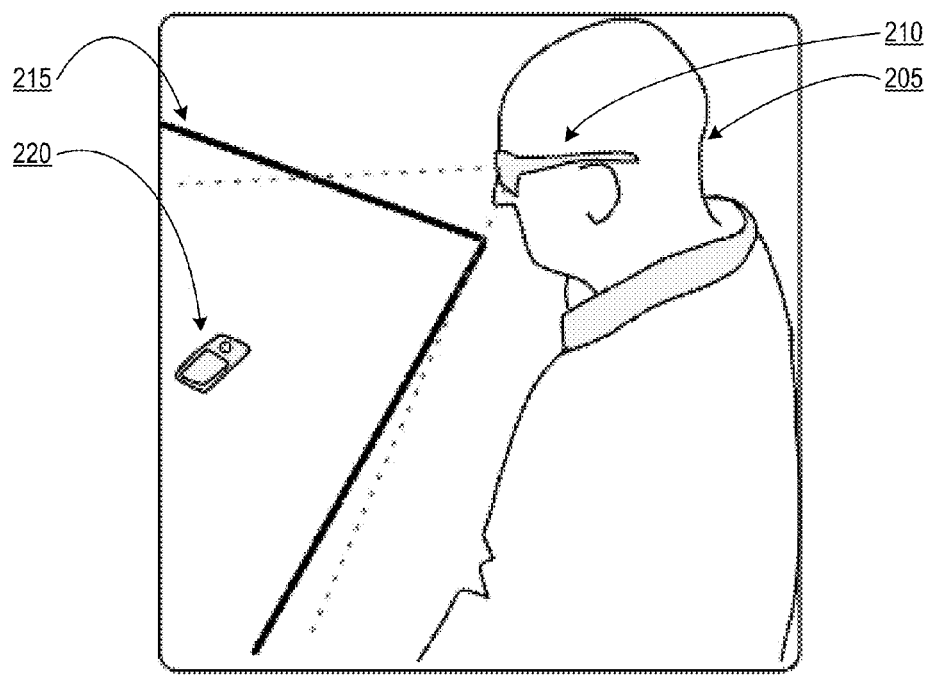
FIGS. 2-7 illustrate a sequence of diagrams that depict an example of providing augmented reality surface segmentation using reference object detection according to some embodiments.

As illustrated in FIG. 2, a user 205 of a head-mounted display unit 210 or other Augmented Reality enabled device may view a physical surface 215, which may be a table or desk, for instance, on which a mobile device 220 has been placed. The mobile device 220 may, for example, be used by head-mounted display unit 210 as a reference object in providing a virtual workspace, in accordance with various aspects of the disclosure. In addition, a camera included in head-mounted display unit 210 may feature a wide field of view, and further may be used by head-mounted display unit 210 in tracking the position and/or movement of rectangular objects in the field of view, as well as the position and/or movement of other objects in the field of view, such as the position and/or movement of the user's fingers. In some embodiments, separate algorithms that are concurrently executed may be used to track the position and/or movement of rectangular objects in the field of view and the position and/or movement of control objects (e.g., the user's fingers) in the field of view. In addition, these tracking algorithms may be executed on head-mounted display unit 210 itself in some embodiments, while in other embodiments, these tracking algorithms may be executed on a mobile computing device that is wirelessly connected to head-mounted display unit 210, such as mobile device 220. In some embodiments, the mobile device 220 comprises a mobile telephone or tablet computer.

Figure 3:
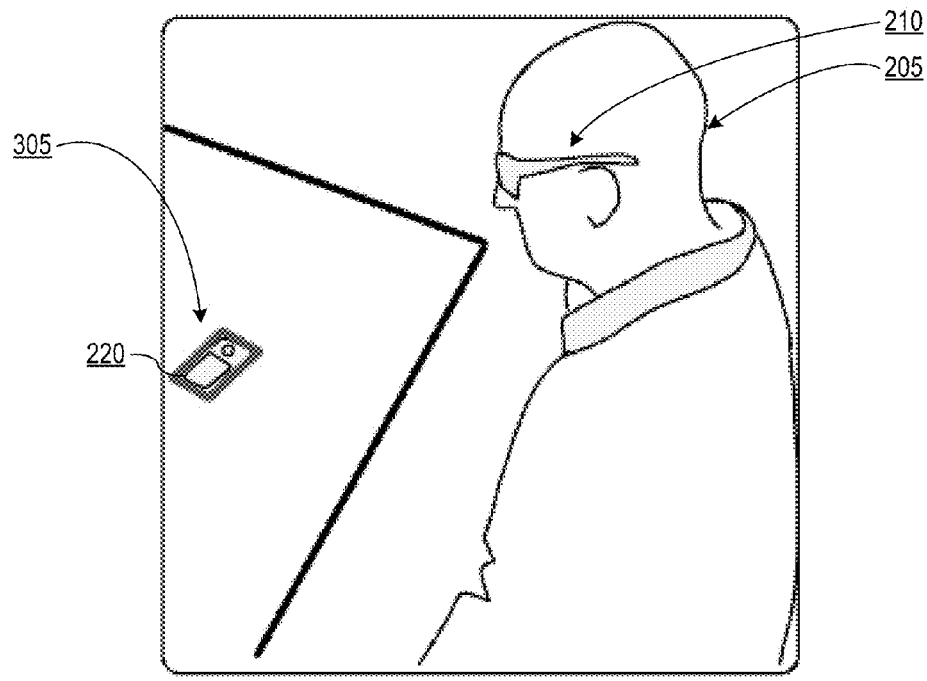

Subsequently, as illustrated in FIG. 3, one or more of the tracking algorithms being executed may detect and/or track the shape of mobile device 220. In addition, based on the detection and/or tracking of the shape of mobile device 220, a visual highlight 305 may be rendered via head-mounted display unit 210 (e.g., for viewing by user 205).

Figure 4:
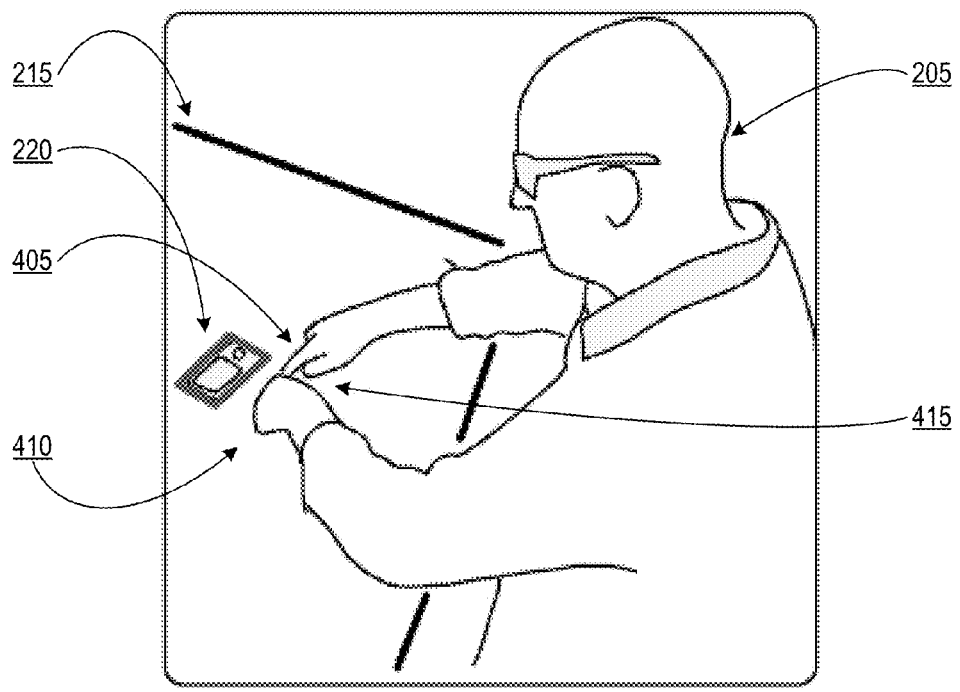
Figure 5:
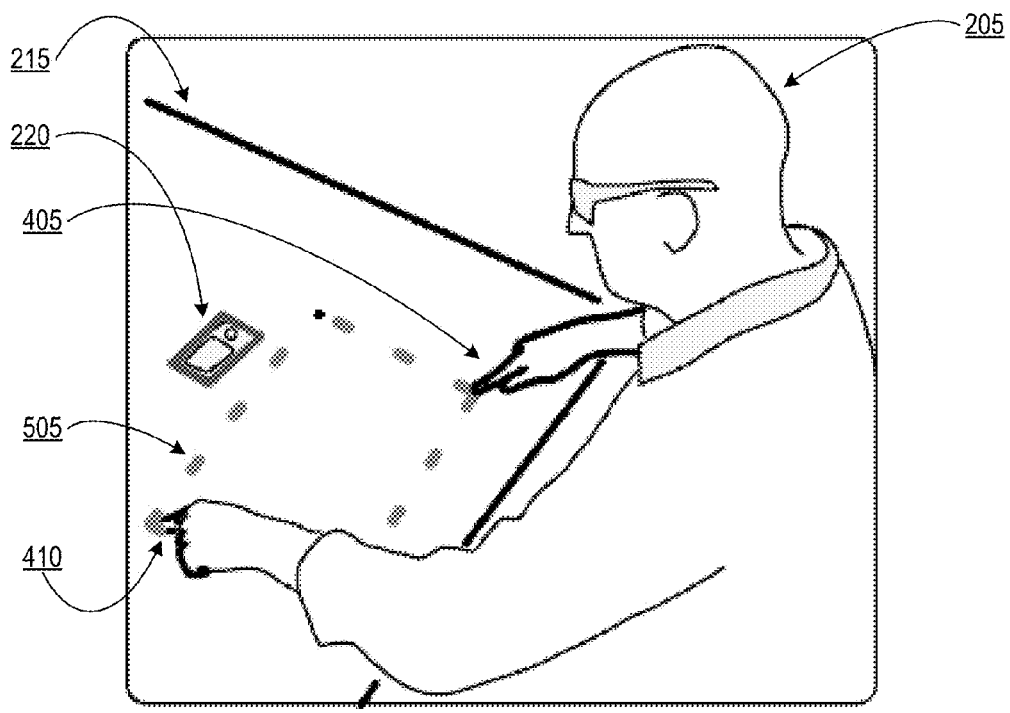

Thereafter, as illustrated in FIG. 4, user 205 may place his index fingers 405 and 410 at a starting point 415 that is in the proximity of mobile device 220 on the physical surface 215. Subsequently, as illustrated in FIG. 5, user 205 may draw his index fingers 405 and 410 apart. A highlight or marquee 505 that delineates a rectangle may follow the movement of the fingertips of index fingers 405 and 410, with each of the fingertips of index fingers 405 and 410 corresponding to a corner of the rectangle delineated by marquee 505. In one or more embodiments, the rectangle delineated by marquee 505 may be aligned with a plane of the physical surface 215 on which mobile device 220 has been placed. In addition, mobile device 220 and/or any other tracked reference object may be used as a reference for the rectangle defined by marquee 505. In some instances, where a fixed aspect ratio may be required by certain content, the dimensions of the rectangle that is delineated by marquee 505 may expand and/or contract in a fixed ratio in proportion to the distance traveled by the fingertips of index fingers 405 and 410 from their starting point 415. Further, in some embodiments input to a user interface or input defining a segment may be provided using a touchscreen, for example similar to how a touchpad or trackpad may be used, or other input of mobile device 220, whether or not mobile device 220 is itself the reference object. For example, in one embodiment, the reference object may comprise a painting on a wall, and in such an embodiment, the user may be able to use an input device on mobile device 220 to defend the segments of a virtual workspace, even though the mobile device 220 is not itself the reference object.

While the example illustrated in FIG. 4 and discussed above involves a highlight or marquee 505 that is rectangular in shape, in some instances, the shape of the highlight or marquee, along with the shape of the surface segment that may be formed based on the highlight or marquee (e.g., as discussed below with respect to FIG. 6), might not be rectangular. For example, the highlight or marquee may be circular in shape, or may have some other shape that varies from the rectangular and circular shapes discussed in these examples. In addition, rather than drawing his or her fingers apart to create the shape of the highlight or marquee, as in the example discussed above, in some additional and/or alternative embodiments, the user may trace an outline of the shape that is to be formed. In other instances, other input may be provided by the user to define such a shape via any and/or all of the interfaces discussed above with respect to input/output subsystem 110 of system 100. For example, in one embodiment, the user may draw an outline of a shape using optical tracking technology. In such an embodiment, input/output subsystem 110 may comprise eye tracking software. In such an embodiment, the user may define a shape by moving his or her eyes to form an outline of that shape. In another embodiment, input/output subsystem 110 may comprise a touchscreen. In such an embodiment, the user may form a shape by drawing on outline of the shape on the surface of the touchscreen. In still another embodiment, input/output subsystem 110 may comprise inertial sensors. Thus, in such an embodiment, the user may form a shape by moving the device in a pattern forming an outline of the shape. The inertial sensors may detect this motion, and thus transmit a signal associated with the outline of the shape to be formed.

Figure 6:
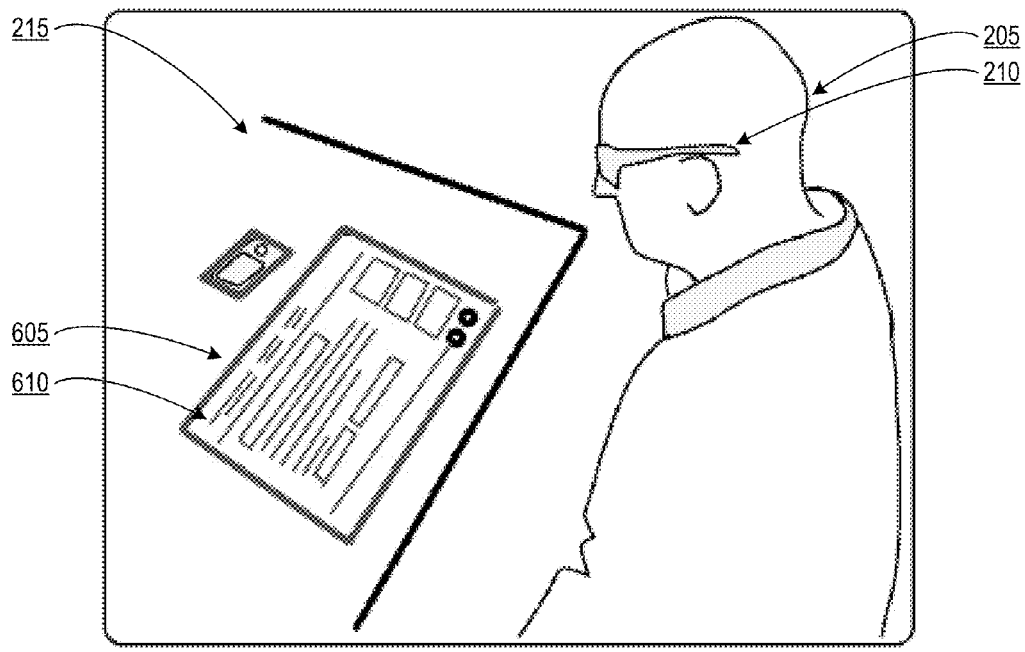

Subsequently, as illustrated in FIG. 6, once user 205 lifts his fingertips of index fingers 405 and 410 off of the physical surface 215, a rectangle 605 may be created in the virtual workspace and rendered via head-mounted display unit 210. The size of rectangle 605 may, for instance, correspond to the size of the rectangle delineated by marquee 505 at the point at which user 205 lifted his fingertips away from the surface. In addition, rectangle 605 may be populated with a user interface 610, which may be rendered via head-mounted display unit 210, so as to enable user 205 to view and/or interact with the user interface. Furthermore, user interface 610 may include one or more active contact areas that user 205 may interact with using his fingertips 405 and 410, in a manner similar to how the user can interact with a user interface displayed on a touch-sensitive display screen.

Figure 7:
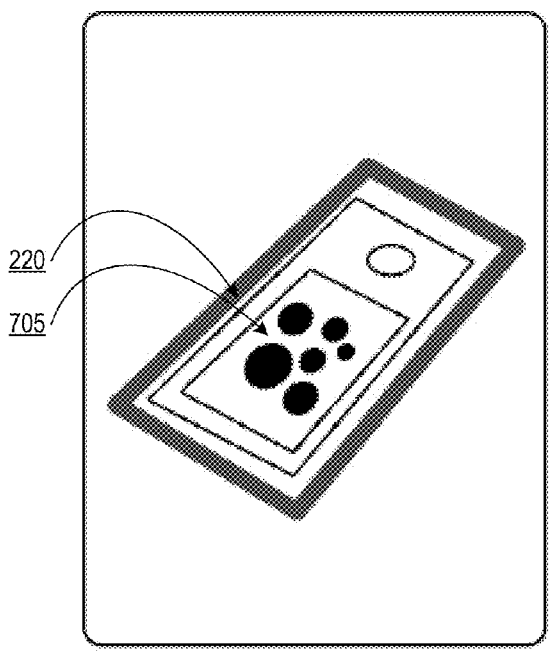

Turning now to FIG. 7, in instances in which a more precise or unique reference object might be needed (e.g., to enable multi-user collaboration in a virtual workspace), a dynamically generated marker 705 can be displayed on the screen of mobile device 220. Marker 705 may, for example, be encoded with a unique pattern that can be interpreted by another augmented reality or head-mounted display unit or other connected device, thereby enabling the other augmented reality or head-mounted display or other connected device to initiate a connection with one or more other head-mounted display units that are rendering, facilitating interaction with, and/or otherwise providing the virtual workspace, such as head-mounted display unit 210.

While the example discussed above with respect to FIGS. 2-7 illustrates how a single segmentation task may be completed (e.g., to create a single surface segment, namely, rectangle 605, in a particular virtual workspace), in other instances, multiple areas can similarly be segmented by the same user using the same reference object (e.g., mobile device 220, as in the example above). In this way, a number of different virtual windows can be delineated and populated in a virtual workspace across a wider area of the physical surface on which the reference object is placed (e.g., on the tabletop or desktop that is before the user).

In some embodiments, when a user moves his or her head, and thus changes the field of view of a camera included in the head-mounted display unit, tracking of a reference object may be lost (e.g., if the user turns around to face the opposite direction and the reference object is no longer within the field of view of the camera). At this point, the user interfaces and/or other virtual objects included in the virtual workspace being rendered by the head-mounted display unit may disappear. However, the virtual workspace, including its associated user interfaces and other virtual objects, may be re-rendered at the same relative size and position relative to the reference object, once the reference object is re-acquired by the camera (e.g., if and when the user turns around to again face the reference object being tracked via the camera included in the head-mounted display unit).

In some embodiments, multiple reference objects may be tracked across a wider area, and this may enable greater interaction with a larger surface, and allow for a wider range of head movement on the part of the user before tracking of the reference object(s) is lost. Additionally, two or more head-mounted display units may be linked, along with one or more other connected devices that may be equipped with cameras, and be worn and/or used by different users. In this way, the different users can share the signature(s) associated with the various reference object(s), and a linked virtual workspace that includes one or more user interfaces and/or other virtual objects may be shared among and/or otherwise provided to the various users of the linked devices to allow for collaborative interactions with the virtual workspace.

Figure 8:
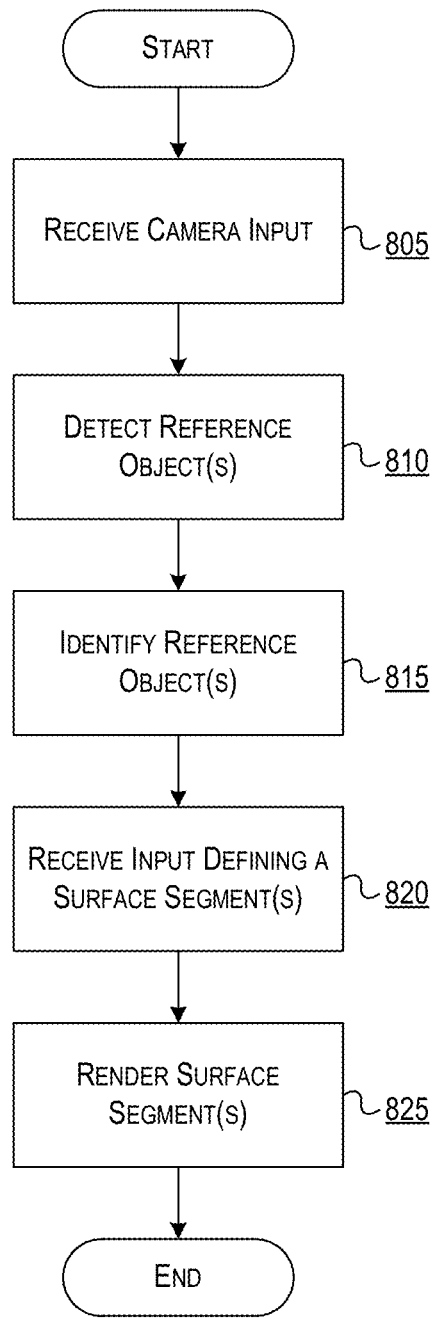
FIG. 8 illustrates a flowchart that depicts an example method of providing augmented reality surface segmentation using reference object detection according to some embodiments.

FIG. 8 illustrates a flowchart that depicts an example method of providing augmented reality surface segmentation using reference object detection according to some embodiments. The processing illustrated in FIG. 8 may be implemented in software (e.g., computer-readable instructions, code, programs, etc.) that can be executed by one or more processors and/or other hardware components. Additionally or alternatively, the software may be stored on a non-transitory computer-readable storage medium. In some embodiments, the method illustrated in FIG. 8 may be performed by a head-mounted display unit, while in other embodiments, the method illustrated in FIG. 8 may be performed by a computing device that is communicatively coupled to, connected to, and/or otherwise linked to a head-mounted display unit. In still other embodiments, the method illustrated in FIG. 8 may be performed in combination by a head-mounted display unit and a computing device that is communicative coupled to, connected to, and/or otherwise linked to the head-mounted display unit.

As seen in FIG. 8, the method may be initiated in step 805, in which camera input may be received. For example, in step 805, image and/or video input may be received as camera input by a head-mounted display unit, and/or a computing device connected to the head-mounted display unit, from one or more cameras included in the head-mounted display unit. The camera input may, for instance, include one or more images of a scene that is before a user of the head-mounted display unit. As in the examples discussed above, such a scene may include a physical surface on which one or more reference objects may be placed, and such reference object(s) may be used by the head-mounted display unit in providing a virtual workspace. In some embodiments, in step 805, system 100 may receive camera input using input/output subsystem 110.

In step 810, one or more reference objects may be detected. In some embodiments, these reference objects may comprise one or more rectangles. For example, in step 810, the head-mounted display unit, and/or a computing device connected to the head-mounted display unit, may analyze the camera input received in step 805 in order to detect the presence of one or more reference objects included in the camera input. In detecting the one or more reference objects, one or more reference object detection algorithms may be used, which may identify one or more reference objects included in the scene based on identifying the physical object(s) in the image data associated with the camera input that match the expected profile of a reference object (e.g., characteristics such as parallel sides and perpendicular corners for a rectangular reference object, or in other embodiments rounded corners, a specific image, etc.). In some embodiments, in step 810, system 100 may detect one or more reference objects using reference object detection subsystem 115.

In some embodiments, a current perspective of the scene also may be determined based on the one or more detected reference objects. In particular, the perspective at which the user of the head-mounted display unit is viewing the scene may be determined based on the one or more detected reference objects and the angles at which such reference objects appear. For example, when the reference object comprises a rectangle, this perspective may, for instance, be determined based on these parameters in view of the fact that, when viewed straight on, such rectangle(s) would have parallel sides and perpendicular corners, among other characteristics.

In step 815, one or more reference objects may be identified. For example, in step 815, one or more reference objects may be identified by the head-mounted display unit, and/or a computing device connected to the head-mounted display unit, based on information describing one or more unique properties of the various reference objects. In some embodiments, the various reference objects may be rectangular in shape, and identifying reference object(s) in the camera input may be based on the results of the reference object detection performed in step 810. In particular, such reference object detection may be used to identify candidates of real-world objects that may be reference objects, and subsequently, the head-mounted display unit and/or the connected computing device may analyze the candidate objects in order to determine which of the candidate object(s) is or are reference objects. In some embodiments, in step 815, system 100 may identify one or more reference objects using control object tracking subsystem 125.

Subsequently, in step 820, input that defines one or more surface segments may be received. Such input may, in some embodiments, define one or more surface segments relative to a physical surface included in the scene and/or relative to one or more reference objects, such as the one or more reference objects identified in step 815, that may be placed on the physical surface. In some instances, the input defining the one or more surface segments may, for example, be user input that delineates and/or otherwise corresponds to a rectangle outlined by the user on the physical surface. For example, the user may place his or her fingers at a starting point in view of the camera included on the head-mounted display, and then draw his or her fingers outwards to define the opposite corners of a rectangle in which a user interface and/or other virtual objects may be rendered, as in the example discussed above with respect to FIGS. 2-7. In some embodiments, in step 820, system 100 may receive input that defines one or more surface segments using input/output subsystem 110.

Referring again to FIG. 8, in step 825, one or more surface segments of a virtual workspace may be rendered. For example, in step 825, the head-mounted display unit and/or the connected computing device may render the surface segment defined in step 820, along with one or more other virtual objects and/or other user interfaces associated with a virtual workspace that includes the defined surface segment. As discussed above, such a surface segment and/or the entire virtual workspace may be associated with a particular reference object, such as the reference object identified in step 815, such that removal and/or replacement of the reference object results in the closing and/or opening, respectively, of the virtual workspace. In some embodiments, in step 825, system 100 may render one or more surface segments of a virtual workspace using surface segment management subsystem 120 and/or rendering subsystem 140.

As discussed above, some embodiments provide a head-mounted display unit that is configured to perform finger tracking and rectangle recognition, and thereby provide a user of such a head-mounted display unit with the ability to look at a combination of real-world objects and virtual objects that are rendered in a perspective matching the user's own field of view (e.g., of the real-world objects). In addition, certain embodiments might not require the user of such a head-mounted display unit to handle a physical device when working with interfaces presented in a virtual workspace.

While some conventional systems may provide other ways of displaying information, these conventional systems are typically inconvenient to use and require a great detail of computational power to provide. For example, some conventional systems may be capable of performing three-dimensional reconstruction of a physical surface by analyzing depth data. But this approach may need to computationally reconstruct a full three dimensional scene. Thus this approach may require the use of more power-hungry depth sensors, as well as a great deal of computational power, to reconstruct a three-dimensional scene. Further, such devices may be heavier and more expensive, thus reducing the likelihood that user's will quickly adopt these technologies. In contrast, the present disclosure provides systems and methods for determining a surface plane which may circumvent the need for these power hungry and expensive processors and sensors.

Rather than using the three-dimensional reconstruction techniques that may be implemented by some conventional systems, some embodiments instead may incorporate reference object detection, for example rectangle detection when the reference object comprises a rectangle such as when the reference object comprise a mobile phone, and object tracking functionalities, which may be more computationally efficient than conventional techniques. In addition, by using reference object detection techniques such as rectangle detection, as discussed above, a head-mounted display unit might not require depth data to correctly render a virtual workspace and/or one or more virtual objects included in such a workspace. Rather, detection of a reference object alone may enable determination of a camera pose. In particular, by knowing what a reference object should look like when viewed head on, knowing that a particular object is, for example, a rectangle, and knowing what the object looks like in currently captured camera data, the camera pose or actual perspective of the head-mounted display unit can be determined, and virtual objects may be rendered, based on how such virtual objects should appear in relation to what is known to be the reference object. For example, a virtual surface may be defined with respect to the reference object based on the camera pose or a pose of the reference object, and a virtual workspace may be rendered within that virtual surface or with respect to that virtual surface.

In some embodiments, a virtual workspace may include segments, user interfaces, and/or other virtual objects that are placed on a number of different surfaces. For example, one window in a virtual workspace can be aligned with a desk that is before a user, and another window in the virtual workspace can be aligned with a wall that is before the user and behind the desk. In this example, the two windows may be displayed at different angles, as a result of their alignment with different real-world objects. In other embodiments, windows within a virtual workspace might not be aligned with any real-world objects. Rather, such windows may simply be defined at any angle and at any position in virtual space, in relation to one or more reference objects.

In some embodiments, a user may be able to define the contents of particular windows in a virtual workspace using his or her fingers. For example, a user may be able to define a first window in a virtual workspace that includes a web browser, and a second window in the virtual workspace that includes a media player. As a user defines the rectangles corresponding to these windows with his or her fingers, a head-mounted display unit can render the windows and allow the user to populate each window by specifying what application(s) should be loaded in each of the spaces, for example by selecting from a list of potential applications or by performing a gesture indicating a particular application.

In some embodiments, as a component of input/output subsystem 110, one or more wide-angle cameras may be incorporated into a head-mounted display unit in order to enhance the head-mounted display unit's ability to track various reference objects. In some instances, even if a user cannot see a particular reference object (e.g., because the reference object is not in the user's field of view), one of the tracking cameras included in the head-mounted display unit may be able to see the reference object, and the head-mounted display unit can render a virtual workspace accordingly. For example, in some embodiments, one or more of the cameras included in the head-mounted display unit may feature a fisheye lens that enables such camera(s) to have a wider field of view than might otherwise be achieved.

In some embodiments, the reference object detection algorithms and/or other tracking algorithms used by a head-mounted display unit can transition between various reference objects included in a field of view in order to provide larger and extended virtual workspaces. For example, based on moments in time in which two or more reference objects are in the field of view of the one or more tracking cameras of the head-mounted display unit, the head-mounted display unit may be able to determine a spatial relationship between the various reference objects. In addition, the head-mounted display unit may subsequently use this spatial relationship in providing the virtual workspace(s).

In some embodiments, particular virtual workspaces of a number of different virtual workspaces may be associated with particular reference objects of a plurality of available reference objects. For example, a user may have one virtual workspace that is defined in relation to his or her smartphone, and another virtual workspace that is defined in relation to his or her tablet computer. In some embodiments, a user can place both of these reference objects next to each other on a physical surface (e.g., the user's desk), and a head-mounted display unit may render the two virtual workspaces as being adjacent to each other. In other embodiments, the head-mounted display unit may prompt the user to select one of the virtual workspaces to be displayed. In some embodiments, where multiple virtual workspaces are available (e.g., in the example above when the user's smartphone and tablet computer are in view of a tracking camera included in a head-mounted display unit), a user may be able to move user interfaces and/or other virtual objects between the various virtual workspaces.

In some embodiments, a virtual workspace may be generated only when a plurality of reference objects are present (e.g. in the example above, a smartphone and a desktop computer). Furthermore, in some embodiments, multiple workspaces may be associated with a single object. In some such embodiments, the user may be prompted to select which workspace is correct. In other embodiments, a most recent workspace may be automatically opened or a context of the user may be used to automatically determine an appropriate workspace. For example, if the user is at work a workspace including email and word processing segments may be opened, but if the user is at home a workspace including a media player segment and a social media segment may be opened. It may be possible in some embodiments for the user to scroll through different workspaces associated with an object, for example using specific hand gestures or voice commands. In some embodiments, a special icon may be shown on a reference object or other notification might be given to the user to alert the user that a virtual workspace can be opened for that object. In such an embodiment, the user might perform a motion (e.g. nodding his or her head, a specific eye motion, a specific hand motion, a movement of a mobile device, etc.) or "click" on the icon to indicated that the user wants to open a specific one of the available virtual workspaces. The icon may be displayed by that reference object, for example when the reference object is a mobile phone, or may be displayed by the HMD so as to appear to be located on or near the reference object.

In some embodiments, a reference object may display a visual indicator, such as for example, a Quick Response (QR) code or some other kind of recognizable code or image in order to cause a particular virtual workspace to be displayed and/or otherwise rendered by rendering subsystem 140 of head-mounted display unit. Such a code may, for example comprise all of the information needed to link to another device and enable a virtual sharing with the other device. For instance, such a code may advertise that certain augmentations and/or other virtual workspaces are available to be displayed by a head-mounted display unit, so that other devices in the vicinity of the reference object displaying the code may render and/or otherwise provide the virtual workspace, and so that other users of such devices can interact with and/or collaborate in the virtual workspace. In some instances, a code might be transmitted as a signal by a reference object, rather than being displayed as an image. For example, a reference object may transmit a Bluetooth signal (or any other wireless signal as may be desired) which notifies devices in the vicinity that are capable of providing the virtual workspace that such a virtual workspace is available. In some embodiments, the code may contain information describing the virtual workspace. In some embodiments, the code may comprise information indicating where a definition of the workspace may be retrieved from or may merely indicate that a virtual workspace is available, for example from a known source or social networking function.

In some embodiments, a user may exit the virtual workspace by concealing the recognizable code so that it is no longer recognizable to reference object detection subsystem 115. For example, in an embodiment where a user wishes to be in a private virtual workspace, the user may place the reference object with its display facing down. In such an embodiment, when the recognizable code is no longer visible, the virtual workspace may be closed. Or in some other embodiments, when the visual indicator is concealed the system may place the user in a private virtual workspace that other users cannot access.

In some embodiments, one or more virtual workspaces may be stored in the cloud (e.g., on a remote server), so as to further enhance the ability to share virtual workspaces between different users and different devices. For example, one person can give a particular reference object to another person, and the other person may then view and/or interact with a virtual workspace associated with the reference object while using his or her own head-mounted display unit, which can load data associated with the virtual workspace from a remote server. Additionally or alternatively, multiple users of multiple different head-mounted display units can interact with the same virtual workspace simultaneously in either a local sharing scenario (e.g., in which all users are sitting at the same table and viewing the same reference object) or in a remote sharing scenario (e.g., in which users are physically located at different locations, but interacting with the same virtual workspace, in a shared session).

In some instances in which a virtual workspace is shared between different users and/or different devices, each individual device may adjust the viewing angle for the virtual workspace for its corresponding user. In other words, while the contents and layout of different user interfaces and/or other virtual objects of a virtual workspace may be defined relative to a reference object, the perspective or viewing angle at which such user interfaces and/or other virtual objects are presented might vary for each of the different users sharing the virtual workspace. Additionally, in some embodiments, a remote user (e.g., a user of a device that is not physically located at the same place as the other users and/or the reference object with respect to which the virtual workspace is being provided to the other users) may be able to select his or her own reference object at his or her own location to be used in providing the virtual workspace. In some instances, such a reference object may be manually selected by the remote user, while in other instances, the remote user's augmented reality or head-mounted display unit may automatically select a reference object to be used in providing the shared virtual workspace.

In some embodiments, virtual workspaces that are stored in the cloud may be accessed by a link, such as a hyperlink, that may be shared by and/or between the various users of the virtual workspace (e.g., via email, via text message, through a QR code, etc.). In addition, any and/or all of the information relevant to the virtual workspace may be directly communicated to the various devices and/or users thereof, for example, visually through a displayed code, wirelessly via a transmitted signal, and/or using other means. In some embodiments, permissions may be defined for each workspace and used to determine whether other users are able to access and/or edit a respective workspace. For example, a user may openly share his workspace for with everyone, may create private workspaces that only the user can access, or may grant permissions to everyone within a social circle or friends network.

In some embodiments, a reference object might not be an electronic device. Rather, in some embodiments, a reference object may be another physical object, for example that is rectangular in shape (e.g., a notepad, a business card, a piece of paper, etc.). Whether or not the reference object is an electronic device, a head-mounted display unit may, in accordance with one or more embodiments, provide one or more virtual workspaces in the various ways discussed above.

In still other embodiments, a reference object may be a physical object of any shape. For example, an augmented reality or head-mounted display unit may be configured to identify unique features of the object, and use the object as a reference object in accordance with the various features discussed above. For instance, a circular object, such as a coaster (e.g., a coaster that may be placed on a coffee table), may be used as a reference object, and a head-mounted display unit may be configured to detect the shape of the coaster in a captured image, select the shape as a reference object, and define one or more virtual workspaces in relation to the coaster, similar to how such virtual workspaces may be defined in the examples discussed above.

Figure 9:
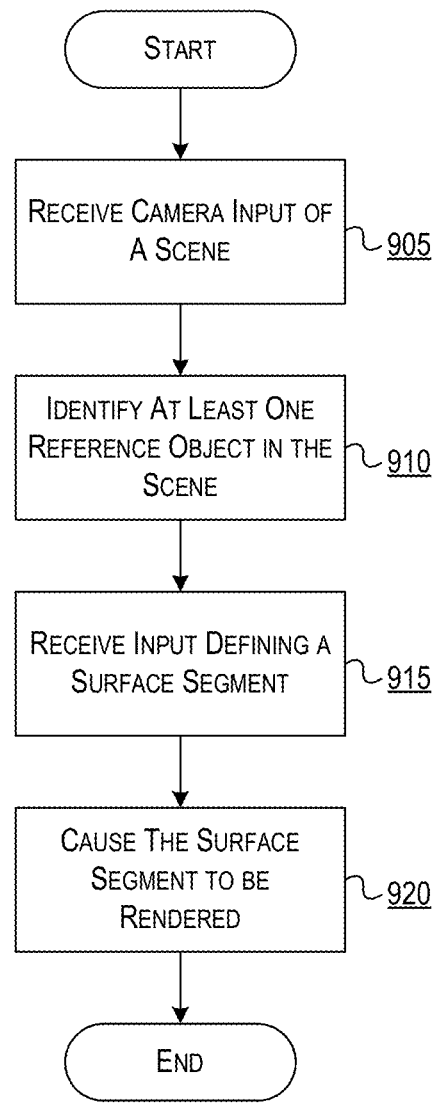
FIG. 9 illustrates a flowchart that depicts an example method of providing augmented reality surface segmentation using reference object detection according to some embodiments.

FIG. 9 illustrates a flowchart that depicts an example method of providing augmented reality surface segmentation using reference object detection according to some embodiments. The processing illustrated in FIG. 9 may be implemented in software (e.g., computer-readable instructions, code, programs, etc.) that can be executed by one or more processors and/or other hardware components. Additionally or alternatively, the software may be stored on a non-transitory computer-readable storage medium. In some embodiments, the method illustrated in FIG. 9 may be performed by a head-mounted display unit, while in other embodiments, the method illustrated in FIG. 9 may be performed by a computing device that is communicatively coupled to, connected to, and/or otherwise linked to a head-mounted display unit. In still other embodiments, the method illustrated in FIG. 9 may be performed in combination by a head-mounted display unit and a computing device that is communicative coupled to, connected to, and/or otherwise linked to the head-mounted display unit. As seen in FIG. 9, the method may be initiated in step 905, receive camera input of a scene. For example, in step 905, image and/or video input may be received as camera input by a head-mounted display unit, and/or a computing device connected to the head-mounted display unit, from one or more cameras included in the head-mounted display unit. The camera input may, for instance, include one or more images of a scene that is before a user of the head-mounted display unit. As in the examples discussed above, such a scene may include a physical surface on which one or more reference objects may be placed, and such reference object(s) may be used by the head-mounted display unit in providing a virtual workspace. In some embodiments, in step 905, system 100 may receive camera input using input/output subsystem 110.

The method continues to step 910, identify at least one reference object in the scene. In some embodiments, these reference objects may be physical objects in the scene. For example, the reference objects may comprise physical three dimensional objects. For example, in step 910, one or more reference objects may be identified by the head-mounted display unit, and/or a computing device connected to the head-mounted display unit, based on information describing one or more unique properties of the various reference objects. In some embodiments, the various reference objects may be rectangular in shape, and identifying reference object(s) in the camera input may be based on the results of the reference object detection step (not shown in FIG. 9). In particular, such reference object detection may be used to identify candidates of real-world objects that may be reference objects, and subsequently, the head-mounted display unit and/or the connected computing device may analyze the candidate objects in order to determine which of the candidate object(s) is or are reference objects. In some embodiments, in step 910, system 100 may identify one or more reference objects using control object tracking subsystem 125.

Subsequently, in step 915, receive input defining a surface segment. Such input may, in some embodiments, define one or more surface segments relative to a physical surface included in the scene and/or relative to one or more reference objects, such as the one or more reference objects identified in step 910 that may be placed on the physical surface. In some instances, the input defining the one or more surface segments may, for example, be user input that delineates and/or otherwise corresponds to a rectangle outlined by the user on the physical surface. For example, the user may place his or her fingers at a starting point in view of the camera included on the head-mounted display, and then draw his or her fingers outwards to define the opposite corners of a rectangle in which a user interface and/or other virtual objects may be rendered, as in the example discussed above with respect to FIGS. 2-7. In some embodiments, in step 915, system 100 may receive input that defines one or more surface segments using input/output subsystem 110.

Referring again to FIG. 9, in step 920, cause the surface segment to be rendered. For example, in step 920, the head-mounted display unit and/or the connected computing device may render the surface segment defined in step 915, along with one or more other virtual objects and/or other user interfaces associated with a virtual workspace that includes the defined surface segment. As discussed above, such a surface segment and/or the entire virtual workspace may be associated with a particular reference object, such as the reference object identified in step 910, such that removal and/or replacement of the reference object results in the closing and/or opening, respectively, of the virtual workspace. In some embodiments, in step 920, system 100 may render one or more surface segments of a virtual workspace using surface segment management subsystem 120 and/or rendering subsystem 140.

Figure 10:
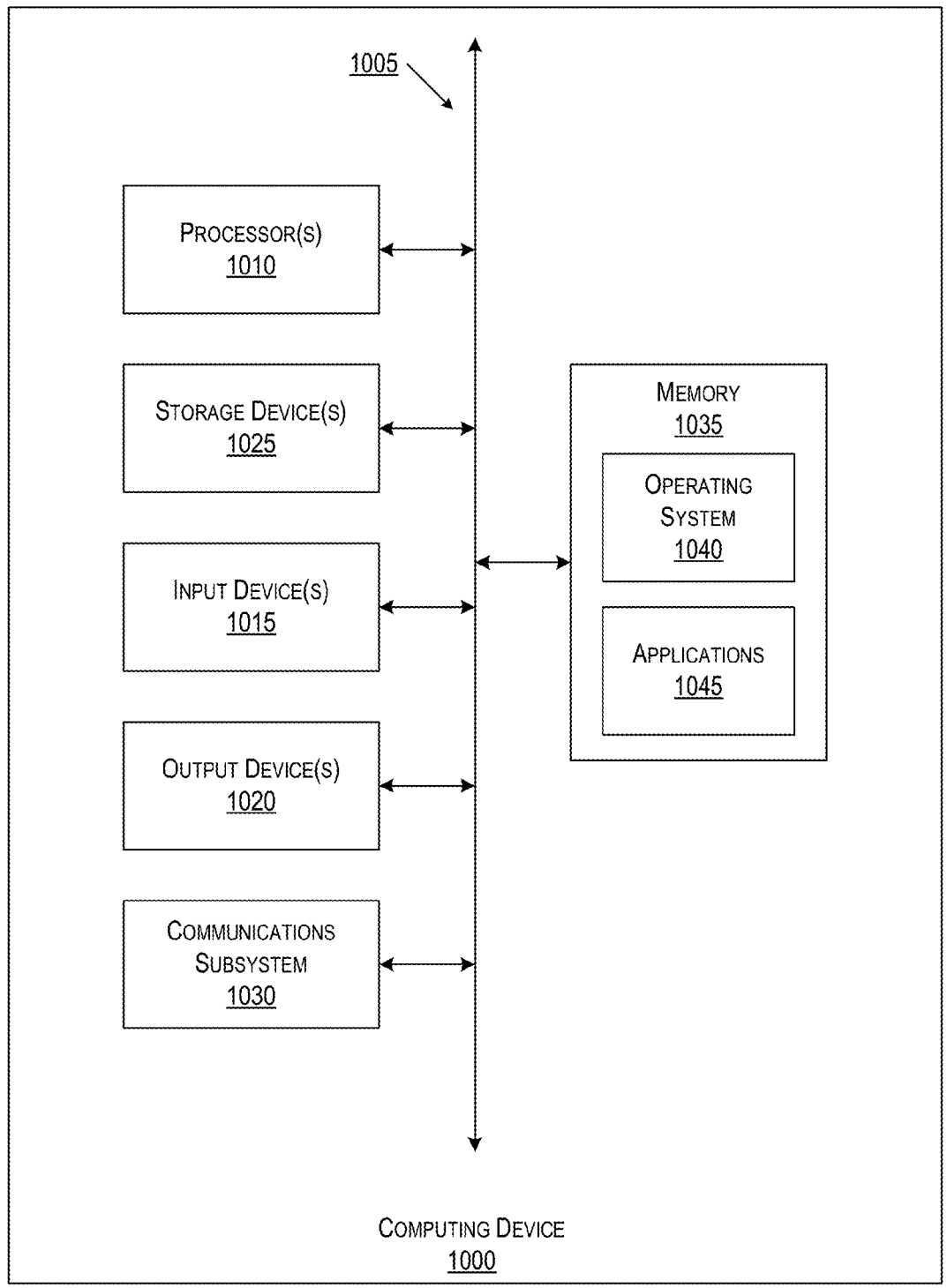
FIG. 10 illustrates an example of a computing system in which one or more embodiments may be implemented.

FIG. 10 illustrates an example of a computing system in which one or more embodiments may be implemented. In some embodiments, a computer system 1000 as illustrated in FIG. 10 may be incorporated as part of a computing device, which may implement, perform, and/or execute any and/or all of the features, methods, and/or method steps described herein. For example, computer system 1000 may represent some of the components of a head-mounted display unit, a mobile device, or any other computing device, such as a laptop computer, a tablet computer, a smart phone, or a desktop computer. In addition, computer system 1000 may represent some of the components of system 100 of FIG. 1 (e.g., memory 1035 may represent memory 105; input devices 1015 and output device 1020 may represent input/output subsystem 110; processor 1010 and/or memory 1035 may provide one or more of the various subsystems of system 100 discussed above, such as reference object detection subsystem 115, surface segment management subsystem 120, control object tracking subsystem 125, rendering subsystem 140; etc.). FIG. 10 provides a schematic illustration of one embodiment of a computer system 1000 that can perform the methods provided by various other embodiments, as described herein. FIG. 10 is meant only to provide a generalized illustration of various components, any and/or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a camera, a mouse, a keyboard and/or the like; and one or more output devices 1020, which can include without limitation a display unit, a printer and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1000 might also include a communications subsystem 1030, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise a non-transitory working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 8, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 1000) to perform methods in accordance with the disclosure. For example, some or all of the procedures of the described methods may be performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein, for example one or more steps of the method(s) described with respect to FIG. 8.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1025. Volatile media include, without limitation, dynamic memory, such as the working memory 1035. Transmission media include, without limitation, coaxial cables, copper wire and fiber optics, including the wires that comprise the bus 1005, as well as the various components of the communications subsystem 1030 (and/or the media by which the communications subsystem 1030 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various embodiments of the invention.

The communications subsystem 1030 (and/or components thereof) generally will receive the signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method comprising:
   receiving a first camera input of a scene;
   identifying at least one reference object in the scene, wherein the at least one reference object is a physical object;
   receiving a second camera input comprising user input from a first user defining a surface segment relative to the at least one reference object, wherein the user input defining the surface segment is a finger movement defining a shape of the surface segment; and
   causing the surface segment to be rendered in the first user's field of vision as though on a surface on which the physical object is located.

2. The method of claim 1, wherein identifying at least one reference object in the scene comprises detecting one or more feature points in the first camera input.

3. The method of claim 1, wherein identifying at least one reference object in the scene comprises receiving a wireless communication from the at least one reference object.

4. The method of claim 1, wherein identifying at least one reference object in the scene comprises detecting one or more rectangles in the first camera input.

5. The method of claim 4, further comprising:
   determining, based on the one or more detected rectangles, a current perspective of the scene, wherein the surface segment is rendered relative to the current perspective of the scene.

6. The method of claim 5, further comprising:
   determining that the current perspective of the scene has changed; and
   dynamically updating the rendered surface segment.

7. The method of claim 1, wherein the finger movement is performed by the first user of a device causing the surface segment to be rendered.

8. The method of claim 7, wherein causing the surface segment to be rendered includes:
   rendering, in a virtual workspace, the surface segment at a first angle; and rendering, in the virtual workspace, a second surface segment defined by the first user at a second angle different from the first angle.

9. The method of claim 8, further comprising:
determining that the at least one reference object has been removed from the scene; and
closing the virtual workspace.

10. The method of claim 9, further comprising:
determining that the at least one reference object has been reintroduced into the scene or another scene; and
opening the virtual workspace.

11. The method of claim 8, further comprising:
detecting a second reference object different from the at least one reference object; and
opening a second virtual workspace different from the virtual workspace.

12. The method of claim 1, wherein the identifying the at least one reference object is based on an image displayed by the at least one reference object.

13. The method of claim 1, further comprising:
transmitting a data signal comprising a virtual workspace that includes the surface segment to an at least one other device,
wherein the virtual workspace is defined by the first user that provided the input defining the surface segment, and
wherein the at least one other device is associated with a second user different from the first user.

14. The method of claim 13,
wherein causing the surface segment to be rendered comprises:
rendering the virtual workspace for the first user; and
based on interaction of the second user with one or more virtual objects included in the virtual workspace, dynamically updating the rendering of the virtual workspace for the first user.

15. The method of claim 1, further comprising:
determining a pose of the at least one reference object based at least in part on the camera input; and
determining a virtual surface separate from the at least one reference object based at least in part on the determined pose, wherein the surface segment is rendered on the virtual surface.

16. The method of claim 1, wherein the first camera input and the second camera input are different signals.

17. A system comprising:
an optical sensor configured to transmit a first input signal comprising an image of a scene;
a display;
a processor configured to:
identify at least one reference object in the scene, wherein the at least one reference object is a physical object;
receive a second input signal from the optical sensor, the second input signal comprising user input from a first user defining a surface segment relative to the at least one reference object, wherein the user input defining the surface segment is a finger movement defining a shape of the surface segment; and
render the surface segment in the display to appear in the first user's field of vision as though on a surface on which the physical object is located.

18. The system of claim 17, wherein the processor is configured to identify the at least one reference object in the scene based on detecting one or more feature points in the image of the scene.

19. The system of claim 17, wherein the processor is configured to identify the at least one reference object in the scene based on receiving a wireless communication from the at least one reference object.

20. The system of claim 17, wherein the processor is configured to identify the at least one reference object in the scene based on detecting one or more rectangles in the image of the scene.

21. The system of claim 20, wherein the processor is further configured to:
determine, based on the one or more detected rectangles, a current perspective of the scene,
wherein the surface segment is rendered relative to the current perspective of the scene.

22. The system of claim 21, wherein the processor is further configured to:
determine that the current perspective of the scene has changed; and
dynamically update the rendered surface segment.

23. The system of claim 17, wherein the finger movement is performed by the first user of a device causing the surface segment to be rendered.

24. The system of claim 23, wherein rendering the surface segment includes:
rendering, in a virtual workspace, the surface segment at a first angle; and
rendering, in the virtual workspace, a second surface segment defined by the first user at a second angle different from the first angle.

25. The system of claim 24, wherein the processor is further configured to:
determine when the at least one reference object has been removed from the scene; and
close the virtual workspace in response to determining that the at least one reference object has been removed.

26. The system of claim 25, wherein the processor is further configured to:
determine that the at least one reference object has been reintroduced into the scene or another scene; and
open the virtual workspace in response to determining the at least one reference object has been reintroduced into the scene or another scene.

27. The system of claim 24, wherein the processor is further configured to:
detect a second reference object different from the at least one reference object; and
open a second virtual workspace different from the virtual workspace.

28. The system of claim 17, wherein the identifying the at least one reference object is based on an image displayed by the at least one reference object.

29. The system of claim 17, further comprising:
a transmitter configured to transmit a data signal comprising a virtual workspace that includes the surface segment to at least one other device,
wherein the virtual workspace is defined by the first user that provided the input defining the surface segment, and
wherein the at least one other device is associated with a second user different from the first user.

30. The system of claim 29, further comprising:
a receiver configured to receive the data signal; and
wherein rendering the surface segment includes:
rendering the virtual workspace for the first user; and
based on interaction of the second user with one or more virtual objects included in the virtual workspace, dynamically updating the rendering of the virtual workspace for the first user.

31. The system of claim 17, wherein the processor is further configured to determine a pose of the at least one reference object based at least in part on the image of the scene, and determine a virtual surface separate from the at least one reference object based at least in part on the determined pose, wherein the surface segment is rendered on the virtual surface.

32. The system of claim 17, wherein the first input signal and the second input signal are different signals.

33. A system comprising:
a means for optically sensing configured to transmit a first input signal comprising an image of a scene;
a means for identifying at least one reference object in the scene, wherein the at least one reference object is a physical object;
a means for receiving a second input signal from the means for optically sensing, the second input signal comprising user input defining a surface segment relative to the at least one reference object, wherein the user input defining the surface segment is a finger movement defining a shape of the surface segment; and
a means for rendering the surface segment to appear in a user's field of vision as though on a surface on which the physical object is located.

34. The system of claim 33, wherein the first input signal and the second input signal are different signals.

35. A non-transient computer readable medium comprising program code, which when executed by a processor is configured to cause the processor to:
receive a first camera input of a scene;
identify at least one reference object in the scene, wherein the at least one reference object is a physical object;
receive a second camera input, the second camera input defining a surface segment relative to the at least one reference object, wherein the second camera input comprises user input defining the surface segment, wherein the user input defining the surface segment is a finger movement defining a shape of the surface segment; and
cause the surface segment to be rendered in a user's field of vision as though on a surface on which the physical object is located.

36. The non-transient computer readable medium of claim 35, wherein the first camera input and the second camera input are different signals.

* * * * *